UNITED STATES PATENT OFFICE 2,120,401

SULPHO-ACETONITRILE DYESTUFFS

Friedrich Felix and Wilhelm Huber, Basel, Switzerland, assignors to the firm of Society of Chemical Industry in Basle, Basel, Switzerland No Drawing. Application April 3, 1936, Serial No. 72,644. In Switzerland April 5, 1935

7 Claims. (Cl. 260—99.30)

The present invention relates to new products of the general formula

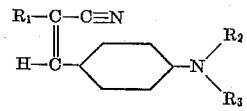

wherein $R_1$ represents the radical of an organic sulphone, $R_2$ and $R_3$ represent alkyl radicals of which at least one radical contains an O—R-group in which R stands for a member of the group consisting of hydrogen, alkyl, and organic acyl radicals, which products do not form salts stable in water with alkalies.

The products have therefore the formula

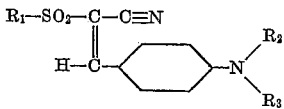

wherein $R_1$ represents alkyl, aralkyl, cycloalkyl and aryl, and $R_2$ and $R_3$ have the meaning indicated above. These products are obtained by treating compounds of the general formula $$R_1-SO_2-CH_2-C\equiv N$$

wherein $R_1$ represents alkyl, aralkyl, cycloalkyl and aryl, with molecular quantities of aromatic aldehydes of the general formula

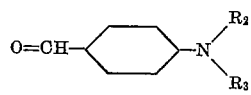

wherein $R_2$ and $R_3$ contain at least one O—R-group in which R stands for a member of the group consisting of hydrogen, alkyl and an organic acyl.

As compounds of the general formula $$R_1-SO_2-CH_2-C\equiv N$$

wherein $R_1$ has the signification indicated above, there may particularly be mentioned:—

Alkylsulpho-acetonitriles, such as methylsulpho-acetonitrile, ethylsulpho-acetonitrile, propylsulpho-acetonitrile, butylsulpho-acetonitrile, allylsulpho-acetonitrile, benzylsulpho-acetonitrile; arylsulpho-acetonitriles such as phenylsulpho-acetonitrile; halogen-benzenesulpho-acetonitriles such as chlorobenzenesulpho-acetonitrile, bromobenzenesulpho-acetonitrile, iodobenzenesulpho-acetonitrile; alkoxybenzenesulpho-acetonitriles such as methoxybenzenesulpho-acetonitrile; toluenesulpho-acetonitriles; xylenesulpho-acetonitriles; nitrobenzenesulpho-acetonitriles; naphthylsulpho-acetonitriles; cyclohexylsulpho-acetonitrile and thiophenesulpho-acetonitrile. The aryl and aralkyl sulpho-acetonitriles may contain further substitutents in the aromatic nucleus such as hydroxy-groups, amino-groups or substituted amino-groups.

As compounds of the general formula

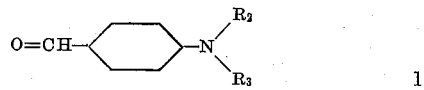

wherein $R_2$ and $R_3$ have the meaning indicated above, there may be named:

(N-alkyl-N-hydroxyalkyl)-aminobenzaldehydes such as (N-methyl-N-hydroxyethyl)-para-aminobenzaldehyde, (N-ethyl-N-hydroxyethyl)-para-aminobenzaldehyde, (N-ethyl-N-hydroxypropyl)-para-aminobenzaldehyde, (N-propyl-N-hydroxyethyl)-para-aminobenzaldehyde, (N-dihydroxyalkyl)-para-aminobenzaldehyde, such as (N-dihydroxyethyl)-para-aminobenzaldehyde, (N-dihydroxypropyl)-para-aminobenzaldehyde, (N-alkyl-N-alkoxyalkyl)-para-aminobenzaldehydes such as (N-methyl-N-methoxyethyl)para-aminobenzaldehyde, (N-ethyl-N-methoxyethyl)-para-aminobenzaldehyde, (N-ethyl-N-ethoxyethyl)-para-aminobenzaldehyde, (N-propyl-N-ethoxyethyl)-para-aminobenzaldehyde, (N-dialkoxyalkyl)-para-aminobenzaldehydes such as (N-dimethoxyethyl)-para-aminobenzaldehyde, (N-alkyl-N-acyloxyethyl)-para-amino-benzaldehydes such as (N-methyl-N-acetoxyethyl)-para-aminobenzaldehyde, (N-ethyl-N-acetoxyethyl)-para-aminobenzaldehyde, (N-ethyl-N-propionyl)-para-aminobenzaldehyde, (N-diacetoxy-ethyl)-para-aminobenzaldehyde, (N-hydroxyalkyl-N-alkoxyalkyl)-para-amino-benzaldehyde, (N-hydroxyethyl-N-methoxyethyl)-para-aminobenzaldehyde, N-bis-dihydroxypropyl)-para-aminobenzaldehyde, (N-hydroxyethyl-N-hydroxychloropropyl)-para-aminobenzaldehyde, (N-methoxyethyl-N-hydroxychloropropyl)-para-aminobenzaldehyde, (N-methoxyethyl-N-α-methoxy-β-hydroxy-propyl)-para-aminobenzaldehyde, (N-hydroxyethyl)-N-α-methoxy-β-hydroxy-propyl)-para-aminobenzaldehyde and the like.

The new condensation products are insoluble in water and are of yellow to orange color; they dissolve in organic solvents, for instance acetone or ethyl acetate, to intensively green-yellow to yellow solutions. On this account they find application as transparent dyestuffs for lacquers or the like which are made from a basis of natural and artificial resins, nitro cellulose, acetyl cellulose, or the like. They may also be used for dyeing artificial materials for instance condensation products from phenols or urea and formaldehyde. They are particularly suitable for dyeing cellulose esters and ethers, more particularly acetate artificial silk, and they produce on these materials dyeings which are characterized by their clarity and excellent properties of fastness.

The following examples illustrate the invention, the parts being by weight:—

Example 1

18.1 parts of phenylsulpho-acetonitrile and 20.7 parts of (N-ethyl-N-methoxyethyl)-para-amino-benzaldehyde are dissolved together in 250 cc. of alcohol and after addition of a few drops of a strong base, for instance piperidine or some alkali or a sodium alcoholate, the solution is boiled for some time under reflux. After a short time the solution becomes intensely yellow owing to the formation of the condensation product and boiling is continued until the intensity of the color no longer increases, this indicating the end of the reaction. The mass is allowed to cool while stirring, during which the condensation product of the formula

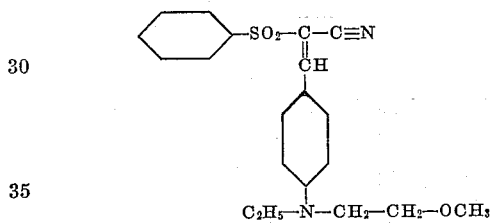

separates. It is a yellow powder soluble in organic solvents like acetone or ethyl acetate to green-yellow solutions and dyeing after suitable suspension, for example when ground with dispersing agents such as sulphite cellulose liquor or sulphonated residues from the benzaldehyde manufacture and water, acetate artificial silk fast green-yellow tints.

Example 2

18.1 parts of phenysulpho-acetonitrile are dissolved together with 19.3 parts of (N-ethyl-N-hydroxyethyl)-para-amino-benzaldehyde in alcohol and after addition of a few drops of piperidine the solution is boiled for some time under reflux. When the reaction is complete the whole is cooled, while stirring, whereupon the condensation product of the formula

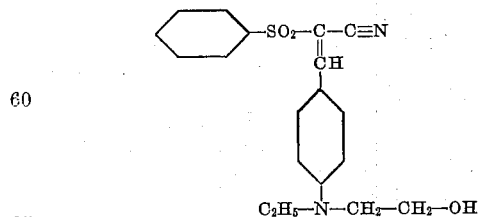

crystallizes. It is a yellow powder and soluble in organic solvents like acetone or ethyl acetate to a green-yellow solution and dyeing, under suitable suspension, acetate artificial silk fast green-yellow tints.

Similar condensation products are obtained when instead of phenylsulpho-acetonitrile there is used, for example methylsulpho-acetonitrile or ethylsulpho-acetonitrile or another alkylsulpho-acetonitrile.

What we claim is:—

1. The sulpho-acetonitrile dyestuffs of the general formula

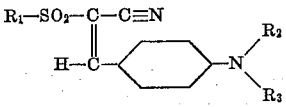

wherein R₁ represents a radical of the group consisting of aryl, alkyl, aralkyl and cycloalkyl, R₂ and R₃ represent members of the group consisting of substituted and unsubstituted alkyl radicals of which at least one is substituted by an OR group in which R stands for a member of the group consisting of hydrogen, alkyl and an organic acyl radical, which products do not form salts stable in water with alkalies, and are yellow to orange colored powders dissolving in ethyl acetate to similar solutions and dyeing cellulose esters and ethers similar tints.

2. The sulpho-acetonitrile dyestuffs of the general formula

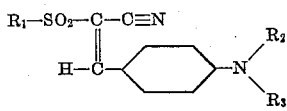

wherein R₁ represents an aryl radical of the benzene series, R₂ and R₃ represent members of the group consisting of substituted and unsubstituted alkyl radicals of which at least one is substituted by an OR group of which R stands for a member of the group consisting of hydrogen, alkyl and an organic acyl radical, which products do not form salts stable in water with alkalies, and are yellow to orange colored powders dissolving in ethyl acetate to similar solutions and dyeing cellulose esters and ethers similar tints.

3. The sulpho-acetonitrile dyestuffs of the general formula

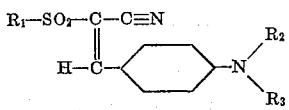

wherein R₁ represents an aryl radical of the benzene series, R₂ and R₃ represent members of the group consisting of substituted and unsubstituted alkyl radicals of which one at least is a —CH₂—CH₂—O—R group in which R stands for a member of the group consisting of hydrogen, alkyl and an organic acyl radical, which products do not form salts stable in water with alkalies, and are yellow to orange colored powders, dissolving in ethyl acetate to similar solutions and dyeing cellulose esters and ethers similar tints.

4. The sulpho-acetonitrile dyestuffs of the general formula

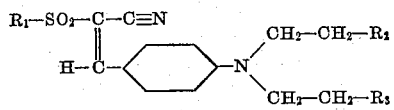

wherein R₁ represents an aryl radical of the benzene series, R₂ represents a member of the group consisting of H, OH, O-alkyl and O-acyl, acyl meaning the radical of an organic acid, and R₃ represents a member of the group consisting of OH, O-alkyl and O-acyl, acyl meaning the radical of an organic acid, which products do not form salts stable in water with alkalies, and are yellow to orange colored powders dissolving in ethyl acetate to similar solutions and dyeing cellulose esters and ethers similar tints.

5. The sulpho-acetonitrile dyestuff of the general formula

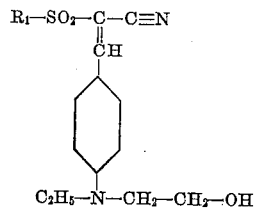

wherein $R_1$ represents a radical of the benzene series selected from the group of the benzene and toluene radicals, which product is a yellow powder dissolving in ethyl acetate to green-yellow solutions and dyeing cellulose esters and ethers similar tints.

6. The sulpho-acetonitrile dyestuff of the general formula

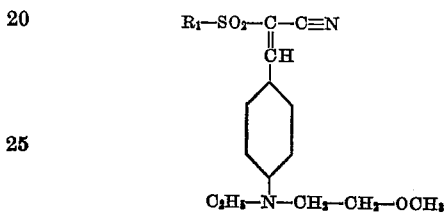

wherein $R_1$ represents a radical of the benzene series selected from the group of the benzene and toluene radicals, which product is a yellow powder dissolving in ethyl acetate to green-yellow solutions and dyeing cellulose esters and ethers similar tints.

7. The sulpho-acetonitrile dyestuff of the general formula

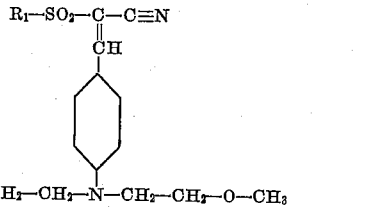

wherein $R_1$ represents a radical of the benzene series selected from the group of the benzene and toluene radicals, which product is a yellow powder dissolving in ethyl acetate to green-yellow solutions and dyeing cellulose esters and ethers similar tints.

FRIEDRICH FELIX.
WILHELM HUBER.